(12) United States Patent
Nicholas

(10) Patent No.: US 6,485,182 B2
(45) Date of Patent: Nov. 26, 2002

(54) SLEEVE BEARING WITH BYPASS COOLING

(75) Inventor: John C. Nicholas, Wellsville, NY (US)

(73) Assignee: Rotating Machinery Technology, Inc., Wellsville, NY (US)

( * ) Notice: Subject to any disclaimer, the term of this patent is extended or adjusted under 35 U.S.C. 154(b) by 8 days.

(21) Appl. No.: 09/819,544

(22) Filed: Mar. 28, 2001

(65) Prior Publication Data

US 2002/0141670 A1 Oct. 3, 2002

(51) Int. Cl.[7] ............................................. F16C 37/00
(52) U.S. Cl. ...................... 384/317; 384/117; 384/900; 384/306
(58) Field of Search ................................ 384/317, 117, 384/311, 307, 309, 313, 315, 316, 306, 900, 907, 122, 398, 369, 321, 123, 322, 368, 276; 184/104.1, 104.3

(56) References Cited

U.S. PATENT DOCUMENTS

| | | | |
|---|---|---|---|
| 3,687,510 A | 8/1972 | Cooper | 308/122 |
| 4,247,157 A | * | 1/1981 | Sigg |
| 4,302,060 A | 11/1981 | Nicholas et al. | 308/9 |
| 4,699,524 A | 10/1987 | Bath | 384/306 |
| 5,288,153 A | 2/1994 | Gardner | 384/311 |
| 5,482,380 A | 1/1996 | Corratti et al. | 384/311 |
| 5,518,321 A | 5/1996 | Hata | 384/311 |
| 5,702,186 A | 12/1997 | Hackstie et al. | 384/117 |
| 5,738,447 A | 4/1998 | Nicholas | 384/117 |
| 5,879,085 A | 3/1999 | Ball et al. | 384/307 |
| 5,915,843 A | 6/1999 | Mattera | 384/316 |
| 5,951,172 A | 9/1999 | Byrne | 384/313 |

* cited by examiner

Primary Examiner—Douglas C. Butler
(74) Attorney, Agent, or Firm—St. Onge Steward Johnston & Reens LLC

(57) ABSTRACT

A non-flooded bearing assembly for rotatably supporting a rotating body and selected from tilting pad journal, tilting pad thrust and sleeve bearings, has a body made from Ampcoloy™ and provided with babbitted bearing and outer surfaces. The bearing assembly has a combination of passages extending between the outer and bearing surfaces for delivering a pressurized liquid lubricant to the bearing surface. A plurality of heat transfer chambers are provided in the body separately from and at a distance from the bearing surface to convey the pressurized liquid lubricant carrying the heat generated by the bearing surface away from the assembly.

24 Claims, 21 Drawing Sheets

SLEEVE BEARING WITH BYPASS COOLING

FIELD OF THE INVENTION

The invention relates to a bypass cooling assembly adapted to carry the heat away from bearing assemblies such as radial, thrust and sleeve bearings of the non-flooded housing type.

BACKGROUND OF THE INVENTION

A segmented bearing assembly is known and includes a plurality of arcuate pads, each tilting through a small angle so as to create a thin wedge shape opening between a shaft and an inner surface of the pad. The opening allows developing a film of oil which supports the load. However, because the film of oil interface is sheared as the oil is dragged through the bearing interface, the oil temperature rises. If the oil temperature rises sufficiently, its viscosity falls, and if the temperature rises substantially, its viscosity falls to a point where there is a direct rubbing of the metal shaft on the metal bearing surfaces, resulting in greater friction which may increase the bearing temperature to destructive level. Also, Babbitt softens at high temperatures and moves or "wipes" due to the shearing forces causing direct metal to metal rubbing.

It is also known that some power loss in tilting pad bearing assembly results from churning the oil after it passes out from underneath the trailing end of the pads. Churning imparts energy to the oil and elevates its temperature. Furthermore, since it is necessary to have some space between the leading and trailing edges of the spaced apart pads to allow the pads to tilt, hot oil emerging from the pad and shaft interface at the trailing end of one pad is carried by the shaft under the leading end of the next ensuing pad contributing to elevated temperatures. Also, cool inlet oil mixes with the hot oil from the pad trailing edge in the space between pads, elevating the temperature of the inlet oil before it enters the next pad's leading edge.

U.S. Pat. No. 5,738,447 to Nicholas, which belongs to the same assignee as the present application and is fully incorporated herein by reference, discloses a non-flooded housing wherein the end seals are wide open and additional drain holes are located in the housing to allow the lubricating oil to exit the housing immediately. The assembly includes a spray bar blocker effectively blocking the hot oil that exits the trailing edge of one pad from mixing with the cool inlet oil. In addition, cool lubricating oil is injected directly onto the leading edge of the next pad.

A material made of C18200 Chrome Copper or Ampcoloy™ copper-based alloy known for its excellent thermal conductivity has been successfully utilized for many years in tilting pad journal and thrust bearings having a flooded bearing shell. This design allows lubricating oil to carry the heat away from the Ampcoloy™ surface at the back and edges of the tilting pads. It is this oil that eventually drains out of the bearing housing carrying away the heat conducted by the Ampcoloy™ away from the babbitt surface.

However, sleeve and segmented bearings having a non-flooded housing design cannot effectively use pads or sleeves made of Ampcoloy™, since the non-flooded structure has no means for carrying the heat away from the tilting pads or from the shell.

It is, therefore, desirable to provide a cooling bypass assembly used in conjunction with a segmented bearing, such as tilting pad journal and thrust bearings having a non-flooded housing, and with a sleeve bearing made predominantly of copper in a such a manner that cool inlet oil carries heat away from the pads and sleeve without interfering with a lubricating process.

SUMMARY OF THE INVENTION

A bypass cooling system including a plurality of heat-transfer chambers, which are strategically located in a bearing assembly having a non-flooded housing and a plurality of blocker bars, effectively carries away the heat from the pads and the sleeve.

In accordance with one aspect of the invention, a sleeve bearing assembly preferably manufactured from C18200 Chrome Copper or Ampcoloy™ has a non-flooded bearing shell which is cooled by inlet cool oil. The cool oil is introduced into circumferential heat transfer chambers or grooves in the vicinity of the bearing's top-dead-center location. Gravity and the inlet oil pressure drives the oil into these heat transfer chambers and further down to the bottom of the bearing shell. Along the way, the cool inlet oil picks up the heat conducted away from the babbitt surface by the Ampcoloy™. Eventually, the cool oil runs directly to the oil drain and is never involved in the lubricating process.

In accordance with another aspect of the invention, a bypass cooling assembly has a plurality of circumferential heat transfer chambers formed along the outer surface of tilting pads of a tilting pad journal bearing, wherein the tilting pads are housed in a non-flooded housing. Cool inlet oil runs along the chambers, which are machined on the outer face of the pads, and picks up the heat conducted away from the babbitted inner and side surfaces of the pads.

According to still another aspect of the invention, a bypass cooling assembly for carrying the heat away from copper pads includes a combination of radial and axial supply channels delivering inlet cool oil into a plurality of circumferential channels, which are machined within the pads. Similarly to the above-discussed modifications of the bypass assembly, this structure allows the heat to be carried away from the babbitted surfaces of the Ampcoloy pads.

The term "oil" is used herein as generic to any liquid lubricant that can be used to cool and lubricate the bearings encompassed by the present inventions.

It is an object of the invention to provide a bypass cooling assembly in bearing assemblies predominantly made from copper and characterized by non-flooded housings.

Still another object of the invention is to provide a bypass cooling assembly for a sleeve bearing assembly wherein cool inlet oil does not interfere with a lubricating process.

Another object of the invention is to provide a bypass cooling assembly for a tilting pad journal bearing assembly having a non-flooded housing.

A further object of the invention is to provide a bypass cooling assembly wherein the outer surface of tilting pads is formed with heat transfer chambers preventing cool inlet oil from mixing up with lubricating oil.

Yet a further object of the invention is to provide a bypass cooling assembly wherein a series of heat transfer chambers are machined within the tilting pads between the opposite outer and inner surfaces.

Still another object of the invention is to provide a bypass cooling assembly in a segmented thrust bearing.

BRIEF DESCRIPTION OF THE DRAWINGS

The above and other features, objects and advantages will become more readily apparent from the following detailed description of the preferred embodiment of the invention in conjunction with the following accompanying drawings, in which.

DETAILED DESCRIPTION OF THE DRAWINGS

Figure 1:
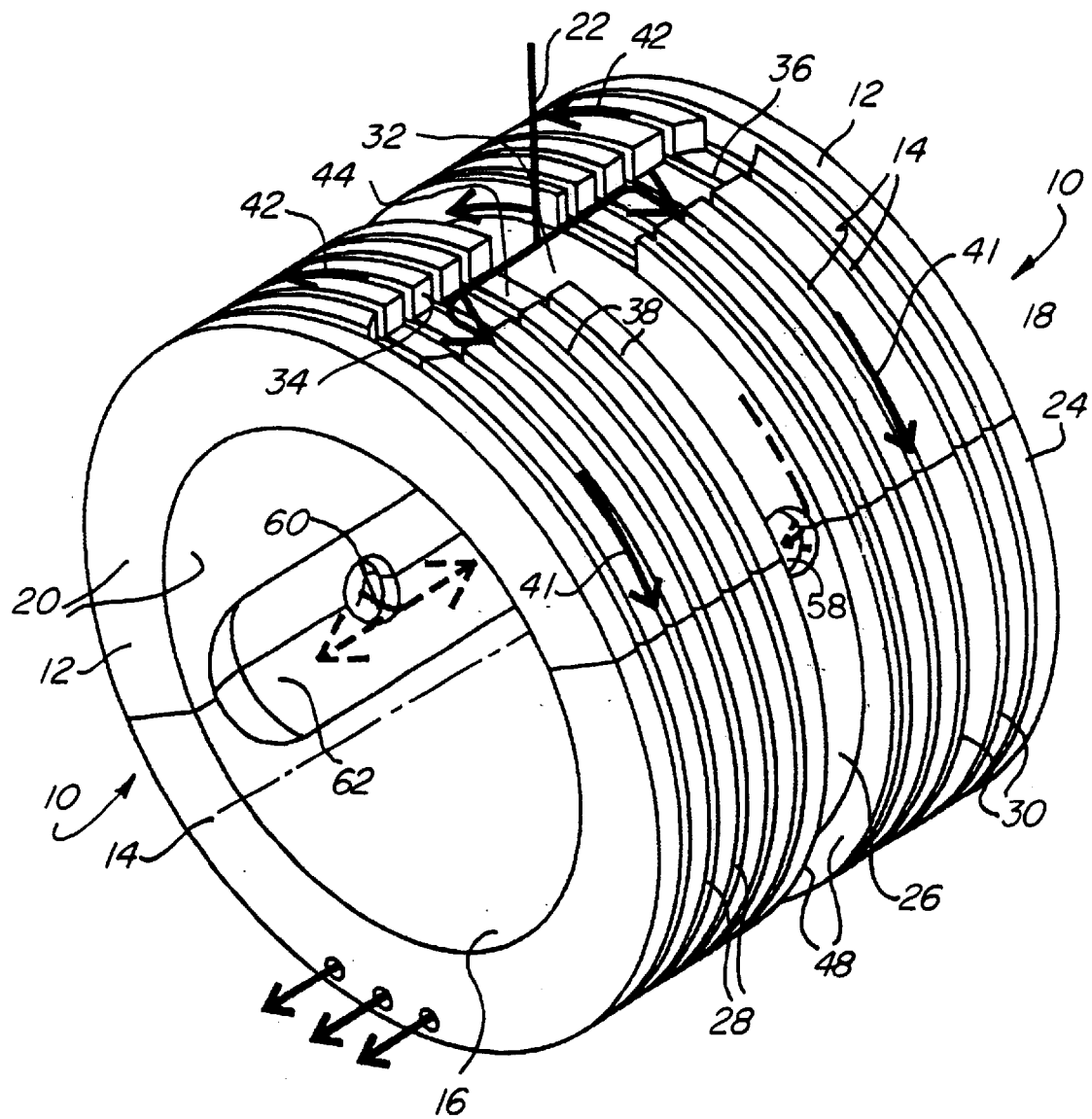
FIG. 1 is a perspective view of a bypass cooling assembly provided in a sleeve bearing in accordance with invention and shown in a position wherein cool inlet oil is initially applied.
Figure 2:
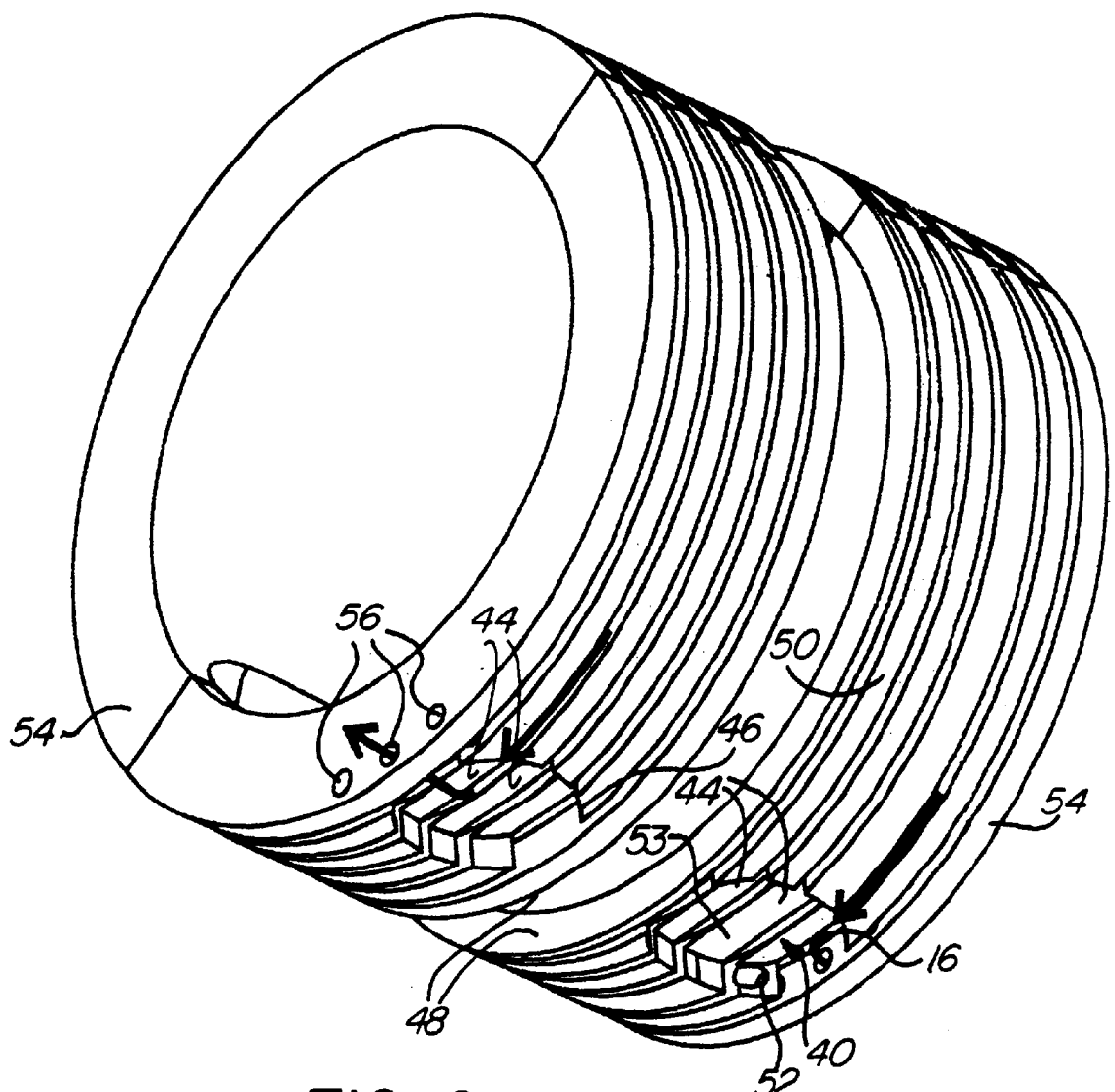
FIG. 2 is a perspective view of the sleeve bearing of FIG. 1 shown in a position wherein the cool inlet oil is being drained.
Figure 3:
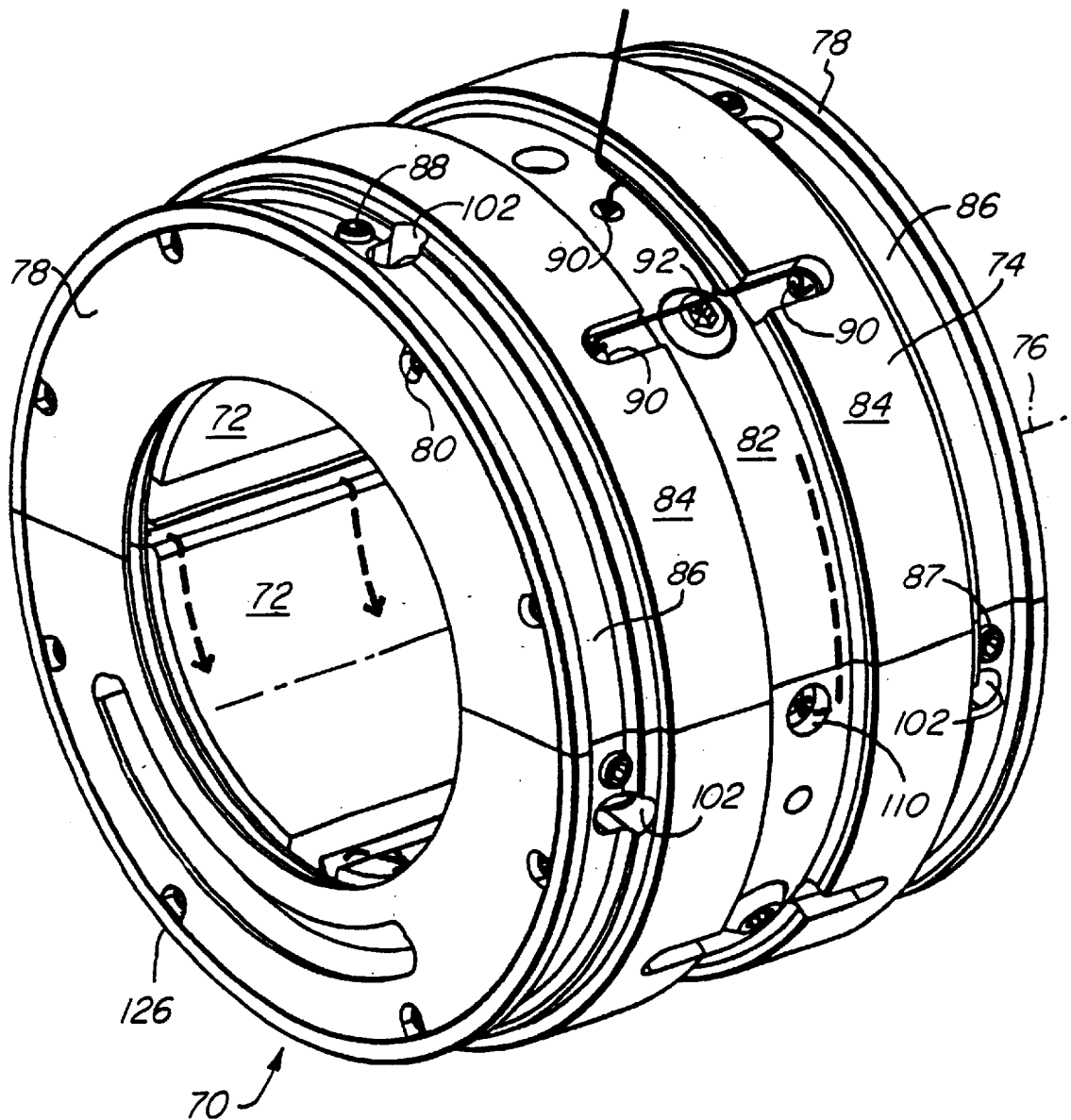
FIG. 3 is a perspective view of the bypass cooling assembly provided in a tilting pad bearing in accordance with one embodiment of the invention; the tilting pad journal bearing is shown in a position wherein cool inlet oil is being introduced.

Referring to FIGS. 1–2, a sleeve bearing assembly has a sleeve shell 10 that may be provided with two halves 12, 14 defining a central opening 16 which typically receives a shaft extending along an axis 18. The shell is manufactured from a material with a very high thermal conductivity of approximately 187 btu/(ft-hr-°F.). Preferably, C18200 Chrome Copper or Ampcoloy™ is used for manufacturing the shell because this material is capable of conducting heat away from the babbitt surface 20 much more efficiently than for example babbitted 1018 carbon steel or babbitted C93200 bearing bronze. In fact, heat conductivity of Ampcoloy™ is more efficient by a factor of 5.5 as compared to bronze and by factor 6.4 as compared to steel. Copper alloy coefficient of thermal conductivity is in a range between 60 and 240. Therefore, the use of this material substantially lowers the bearing's maximum temperature, which, in turn, allows the bearing to operate at a higher speed, greater load and/or with less lubricating oil flow.

To carry the heat away from the bearing shell, cool inlet oil is introduced under pressure through openings in an outer ring surrounding the bearing shell, not shown here but well known in the art, along a path 22 onto an outer surface 24 of the bearing shell 10 above the bearing's top dead center. The surface 24 is provided with a central channel 26 aligned with the openings and separating two groups of circumferential heat transfer chambers or grooves 28 and 30 which are, thus, spaced from one another in an axial direction.

Both groups of the heat transfer chambers are recessed at 32, 34, respectively, to form an axial inlet channel 36 also including a region of the central channel 26 to allow the inlet cool oil to flow into the grooves 28, 30 under gravity and the inlet oil pressure. Accordingly, the inlet cool oil can be driven along segments of the outer surface towards a cool oil drain region 40 (FIG. 2) in opposite directions, as shown by arrows 41 and 42 in FIG. 1. Each of the heat transfer grooves is separated from a neighboring chamber by a land 44, which preferably lies flush with the bottom of the central channel 26 and, thus, does not prevent the flow of cool oil in an axial direction along the channel 36. Ribs 38 define the heat transfer chambers along a circumferential path of cool oil between the recessed regions 32, 34 and the drain region 40, which includes axially spaced regions 46 (FIG. 2). Note that cool oil does not have to be introduced at the very top of the shell. It can be supplied at any point along an upper segment of the bearing since a pressure, at which cool oil is introduced, is sufficient to drive it along any arcuate stretch of the heat-transfer chambers.

The inward ribs 48 delimiting the central channel 26 are continuous except for the inlet channel 36, and, thus, each of the regions 46 recessed in the outer surface 24 of the shell receives cool oil from a respective group 28, 30 of the heat transfer chambers. To at least partially control the flow of cooling oil out of the draining region, the sidewalls 54 of the bearing shell are provided with a row of holes 56, a central one of which is axially aligned with the recessed region 46.

Although the region 46 can have any shape, because of the manufacturing requirements, it is preferred to provide this region with a circular shape. Accordingly, the edges of side ribs 50 are spaced apart at a smaller circumferential distance than a distance between respective edges of the intermediate ribs. As a result of such configuration, two side draining holes 56 are somewhat blocked from inward heat transfer chambers formed in the draining region. To improve the flow communication at least between one of the inward heat transfer chambers and the side holes 56, a passage 52 can be provided in a flat face of the edges of the rib 50 which is immediately adjacent to the side 54 of the bearing shell. Note, the passage 52 and the holes 56 can have a variable shape and size to optimize the oil flow from the draining region and to prevent flooding. Moreover, the passage 52 is preferably aligned with the respective one of the side holes 56 to efficiently convey the flow away from the region 46. Furthermore, each of the drain regions 46 can be provided with an axial channel 53, as shown in phantom lines in FIG. 2, which interrupts the continuous surface of the lands 44 to direct the oil flow toward the holes 56.

Inner surface 20 of the bearing shell is covered (babbitted) with a thin layer of soft material, such as a lead or tin based babbitt to prevent the rotatable shaft from damages incurred by the bearing shell if metal to metal contact occurs. Typically, the overall thickness of the layers does not exceed one inch. To lubricate the inner surface, lubricating oil is delivered through the central channel 26, a radial hole 58 (FIG. 1) and an exit opening 60, which is formed in an indentation 62 in the inner surface 20. Thus, as the cool inlet oil flows along its path, it picks up the heat conducted away from the babbitted inner surface by the Ampcoloy™. As a consequence, the inlet cool oil does not interfere with the lubricating oil.

It is estimated that the Ampcoloy™ sleeve bearing with the bypass cooling assembly reduces the maximum babbitt temperature by approximately 20%, which, in turn, will add about 25% to the bearing's load capacity.

Referring to FIGS. 3–10 the bypass cooling system, as shown in conjunction with a tilting pad journal bearing 70, allows cool inlet oil to flow on and through the tilting pads without interfering with a lubricating process of the babbitted inner surfaces of tilting pads 72 (FIG. 4) which rotatably support a shaft (not shown) extending along an axis 76. Particularly, the tilting pad bearing 70 has a shell or casing 74 and a pair of side plates 78 which are attached to the casing by a plurality of fastening elements 80. The casing is provided with a central circumferential channel 82 defined between two raised annular ribs 84, and two annular side regions 86 provided with a plurality of fastening elements 87 which attach blocker bars 88 (FIG. 5) to the casing.

The blocker or spray bars 88 (FIGS. 5, 5A and 10) extend radially and between the trailing and leading edges of the adjacent pads and, in combination with the inventive bypass cooling assembly, direct the heat, which is generated within the non-flooded housing, away from the tilting pads made from the Ampcoloy™, as explained herein below.

Figure 4:
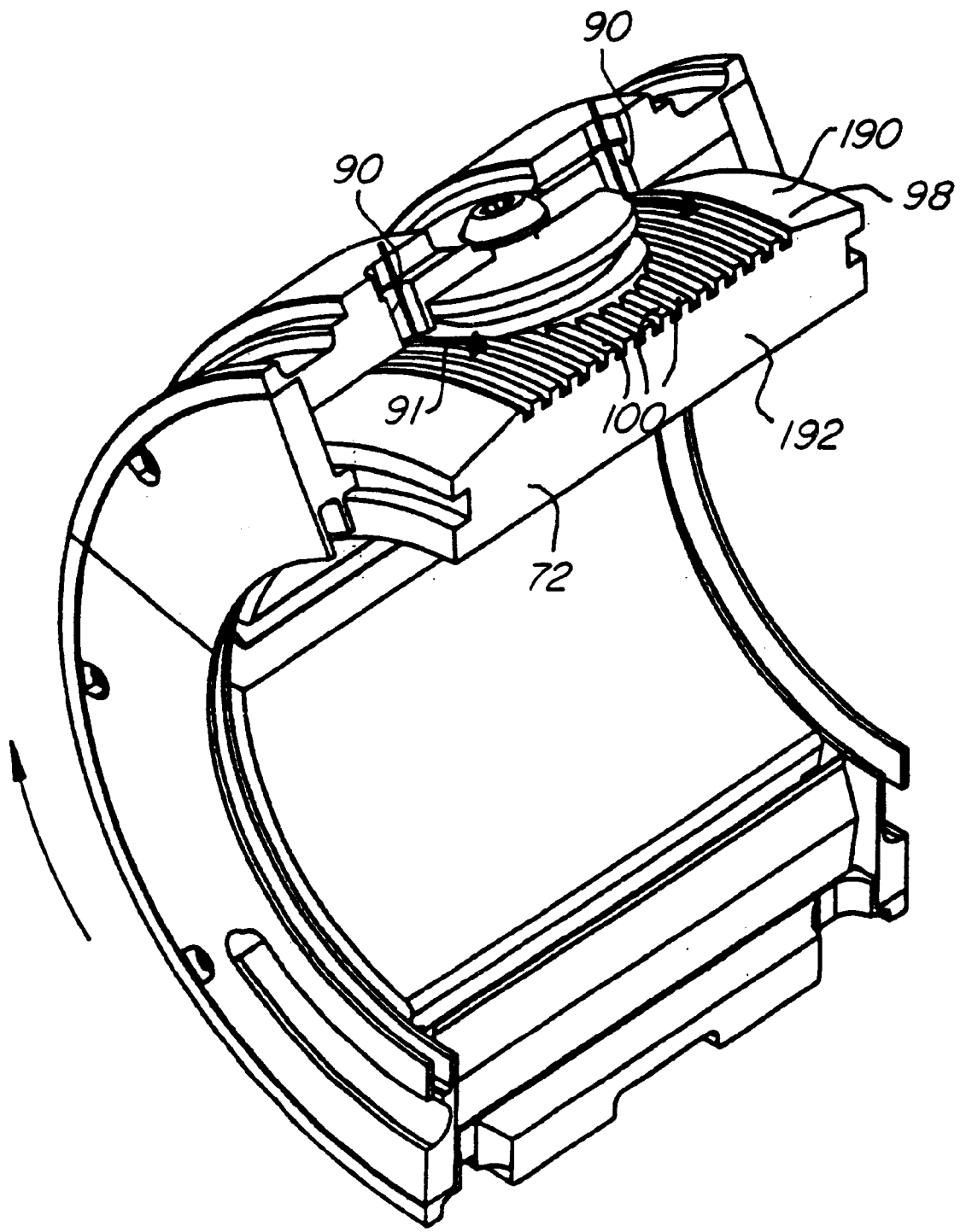
FIG. 4 is another perspective view of a segment of the bypass cooling assembly of FIG. 3 shown with heat transfer chambers which are machined on the outer surface of a tilting pad.

The bypass cooling assembly includes a combination of a plurality of upstream cool oil inlets 90 (FIG. 3) provided in the shell 74, wherein at least one of the inlets may be located in the central channel 82, whereas the rest of inlets can be provided in recessed regions of the ribs 84 typically axially aligned with bolts 92 which hold a pivot 94, such as a spherical bolt or any other pivotal element (FIGS. 7 and 9), into the shell. As shown in FIG. 4, the inlets 90 can extend in a plane substantially perpendicular to a tangent 91 to the circumference of the pad; however, it is conceivable to manufacture these inlets so that they extend at an obtuse angle with respect to the tangent.

Figure 5:
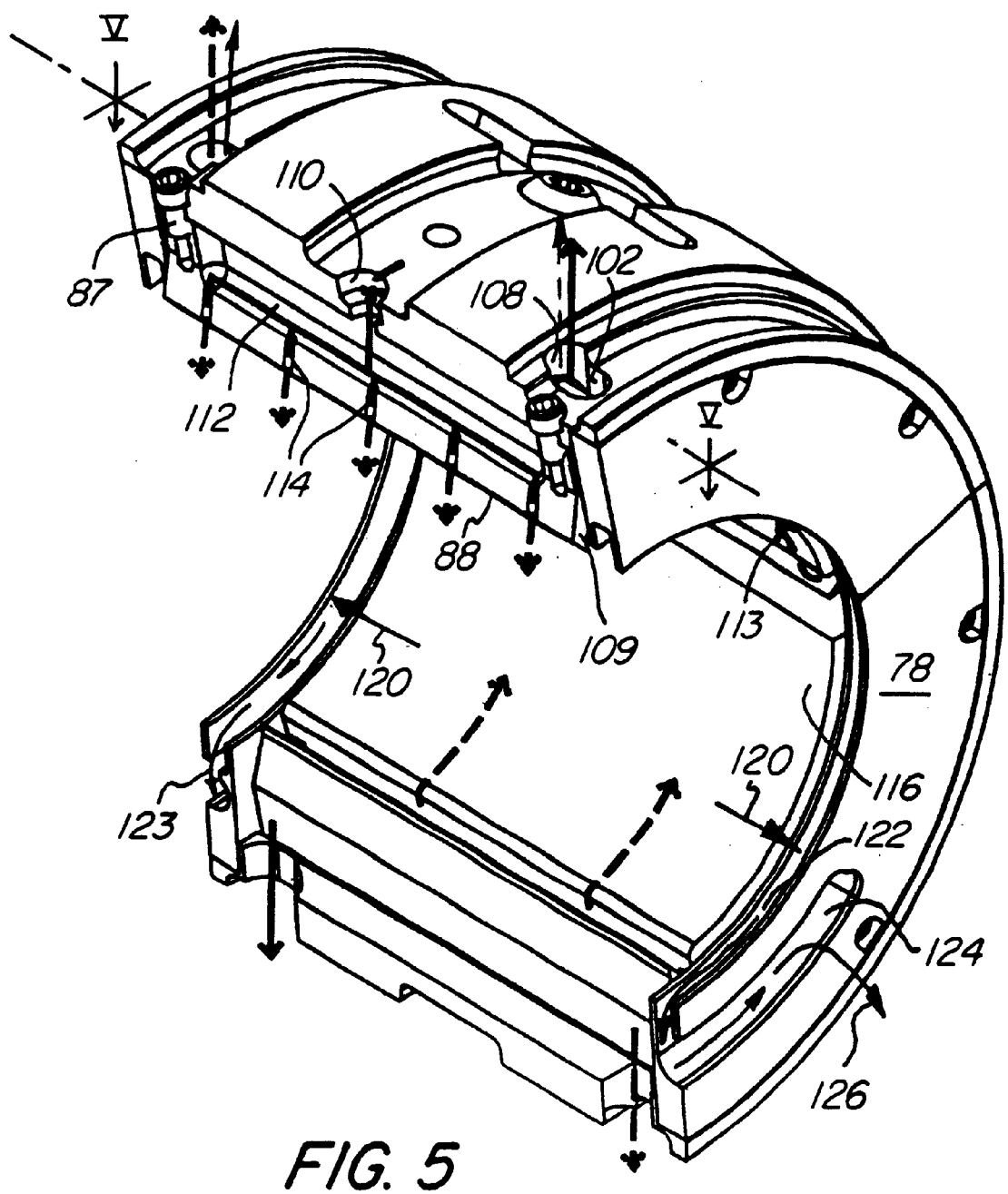
FIG. 5 is still another perspective view of a segment of the bypass cooling assembly of FIG. 3, which illustrates an outlet of the assembly.
Figure 5A:
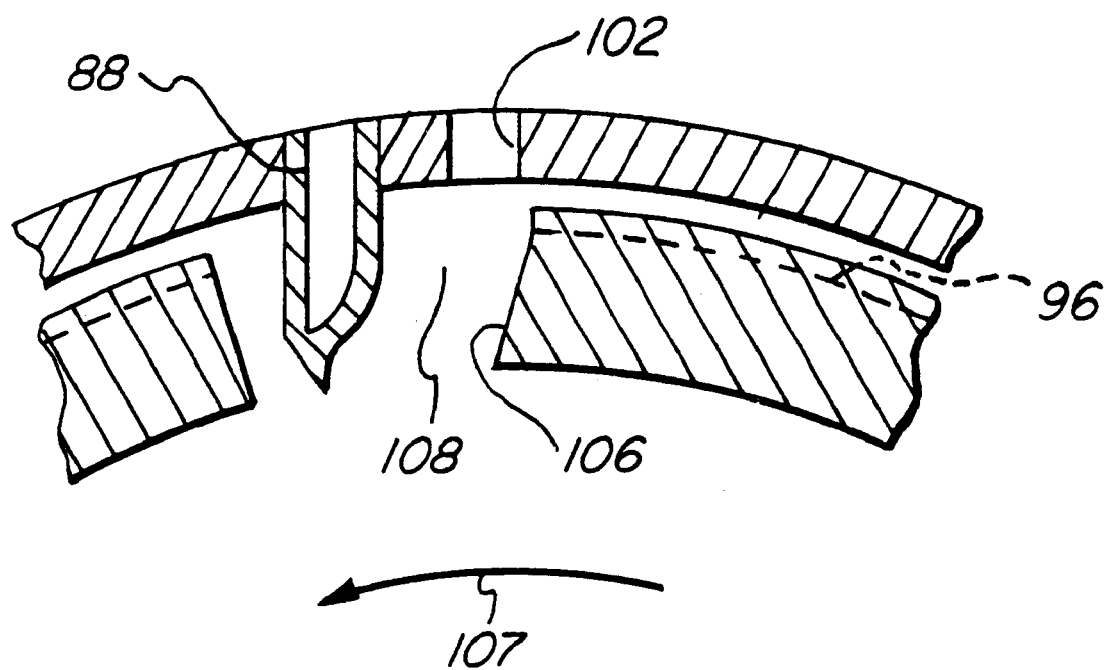
FIG. 5A is an axial sectional view along lines V—V shown in FIG. 5.
Figure 6:
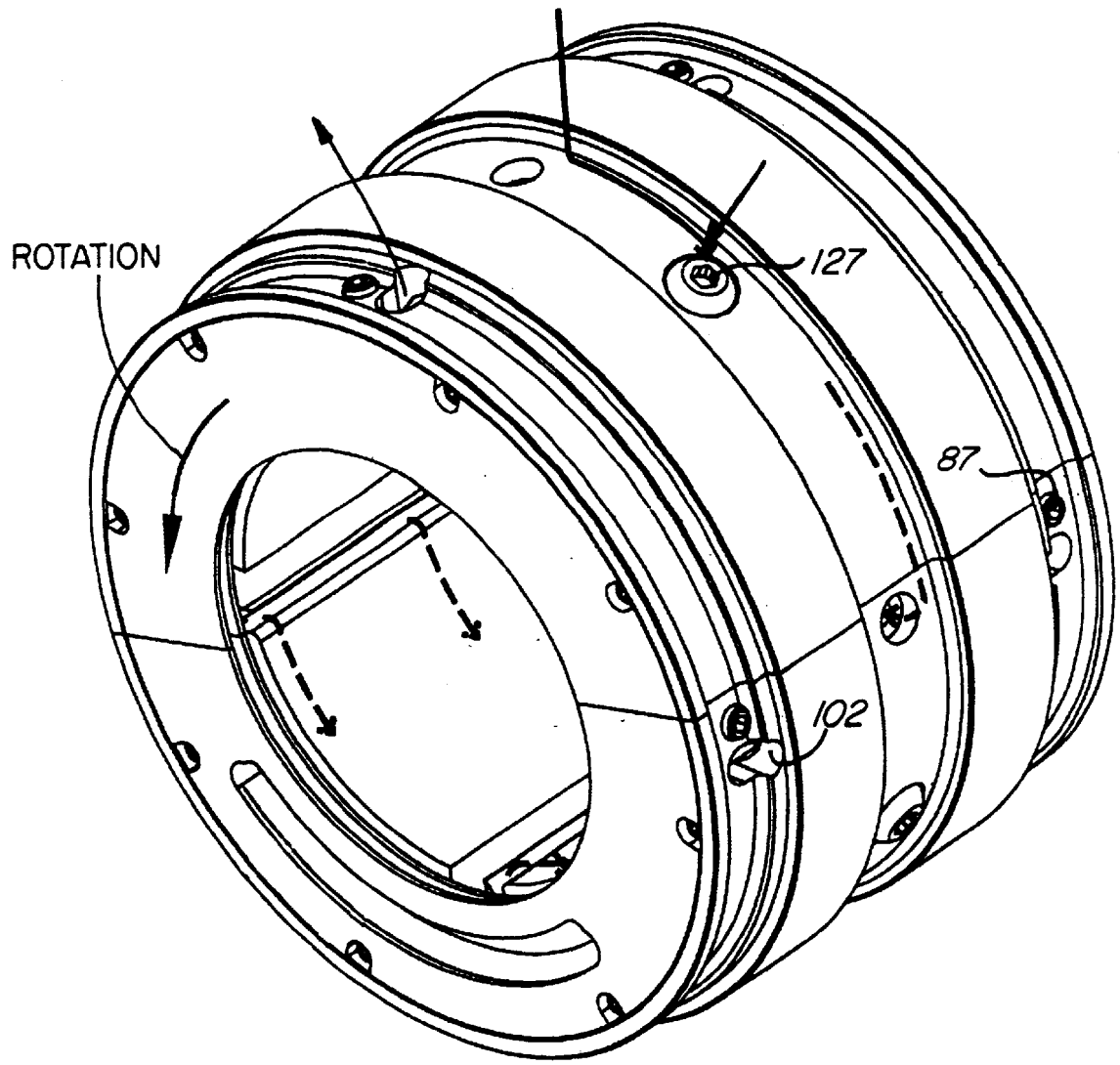
FIG. 6 is a perspective view of another embodiment of the bypass cooling assembly shown in FIG. 3 of the invention.
Figure 7:
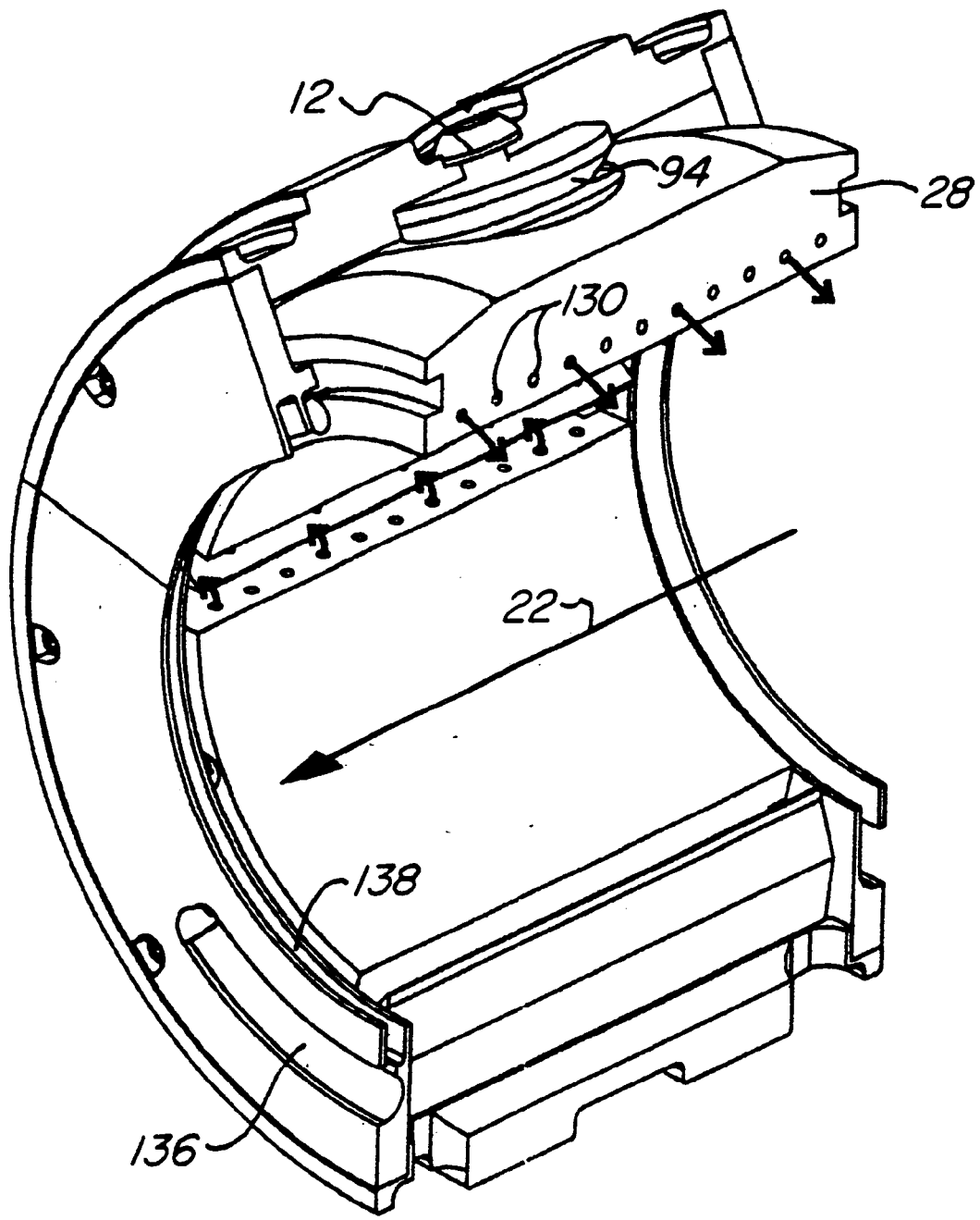
FIG. 7 is a perspective view of the cooling assembly of FIG. 6 showing heat transfer chambers provided within a tilting pad.

Cool inlet oil, which is supplied under a substantial pressure through the inlets 90, is further driven along a plurality of circumferential heat-transfer chambers 96 machined on the outer surface of the pads 72 until the bypass oil is received in a drain region or channel 102, as better illustrated in FIGS. 4 and 5A. Similarly to the bypass cooling assembly, as disclosed in regards to the sleeve bearing, the heat-transfer chambers are defined between ribs 100 (FIG. 4) circumferentially running between the inlet and drain regions of the assembly. As the cool inlet oil advances towards the drain region, it picks up the heat conducted away from the babbitted surface by the Ampcoloy™ pads.

As better shown in FIG. 5A, each of the drain regions is formed immediately upstream from the blocker bar 88, as defined with respect to a rotational direction 107 of the shaft, and forms in combination with a trailing edge 106 and an outer diameter of the rotating shaft a space 108, which receives the bypass oil exiting the heat transfer chambers 96. The space 108 is aligned with and opens into a drain channel 102 (FIGS. 3–5) provided in the side regions 86 of the shell to allow the heated inlet oil to flow outside.

As shown in FIG. 5, lubricating oil is introduced under pressure in an oil conduit 110 of the spray bar extending radially inwardly from the central channel 82 and guiding the lubricating oil into an axial passage 112. The axial passage distributes the lubricating oil between parallel radial passages 114 ejecting the oil toward a leading edge of the pads. The shaft thus rides on a film of lubricating oil, which, as the shaft rotates, is dragged along a bearing surface towards the trailing edge of the pad and into the space 108 (FIG. 5A), from which it can flow through the drain channel 102.

In addition, the drain system, as shown in FIG. 5, conveys the lubricating oil flowing along the inner bearing surface 116 and directed axially toward the opposite sides of the pad, as indicated by arrows 120, along inner channels 122 toward a drain recess 124 which is formed in the side plate 78 of the bearing. The recess is open outwardly to guide the lubricating oil outside, as shown by arrows 126 (FIG. 5). As can be appreciated, the drain system prevents the inlet cool oil from mixing up with the lubrication oil.

In accordance with another embodiment of the bypass cooling assembly of the invention, the inlet cool oil is introduced into the interior of the tilting pad through a bolt 127 (FIGS. 6, 7) holding the spherical pivot 94 into the bearing shell. As better illustrated in FIGS. 8 and 9, the bypass assembly further includes a plugged axial channel 128 machined into the Ampcoloy pad and being in flow communication with the interior of the bolt. The cool inlet oil traversing the interior of the pad and the axial channel is distributed through a plurality of circumferential heat transfer channels 130 (FIGS. 7,9) drilled in the region of the trailing edge of each pad at a radial distance from the babbitted inner and outer surfaces. The heat transfer channels drilled out in the pads' trailing edges convey the heat away from the inner babbitted surface similarly to the previously explained embodiments.

Figure 8:
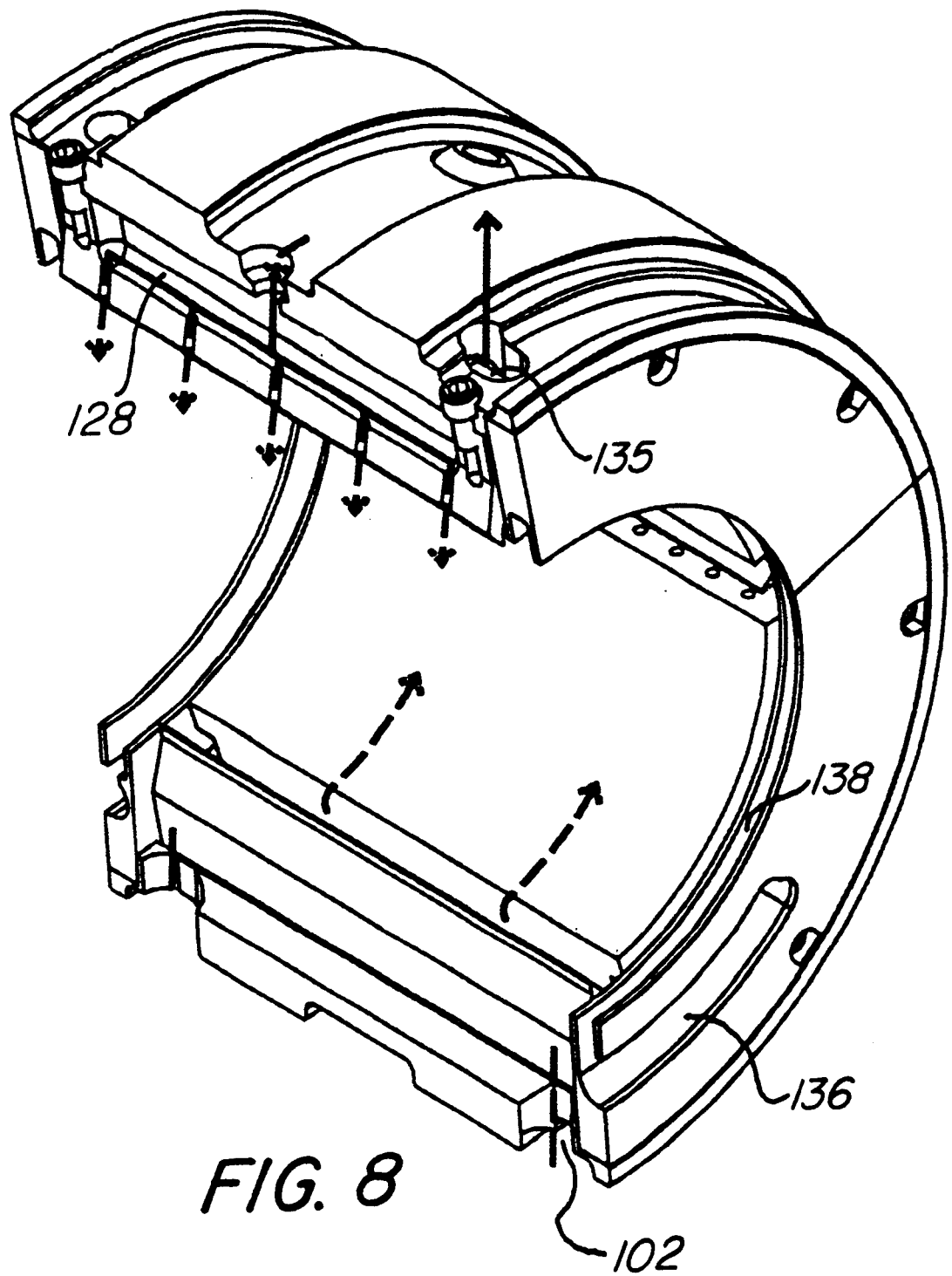
FIG. 8 is a perspective view of the cooling assembly of FIG. 6 illustrating a drainage system.
Figure 9:
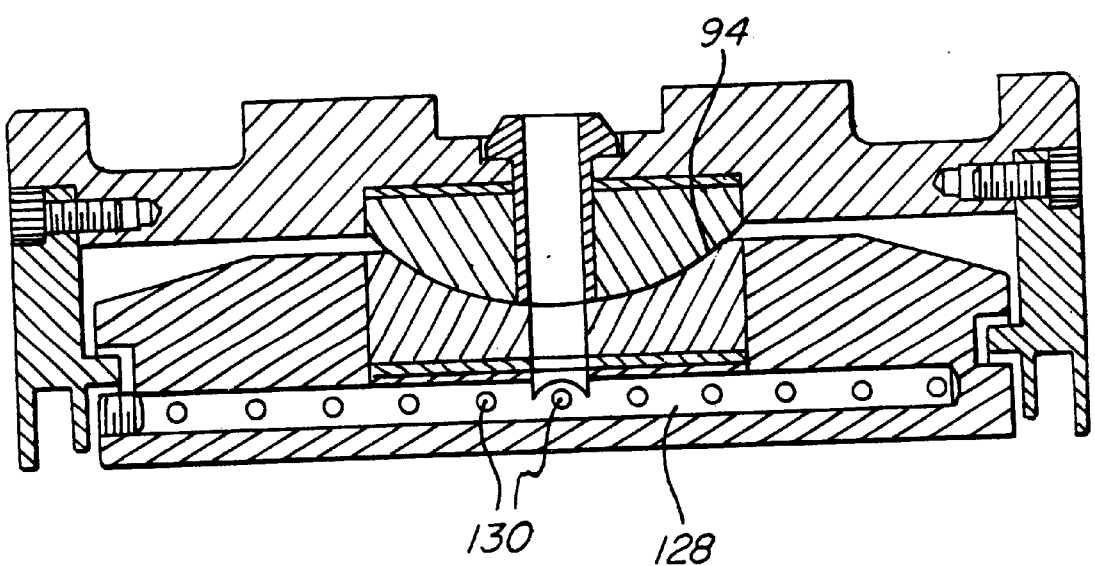
FIG. 9 is a cross-sectional view of the cooling assembly of FIG. 6 taken along lines IX—IX see in FIG. 7.
Figure 10:
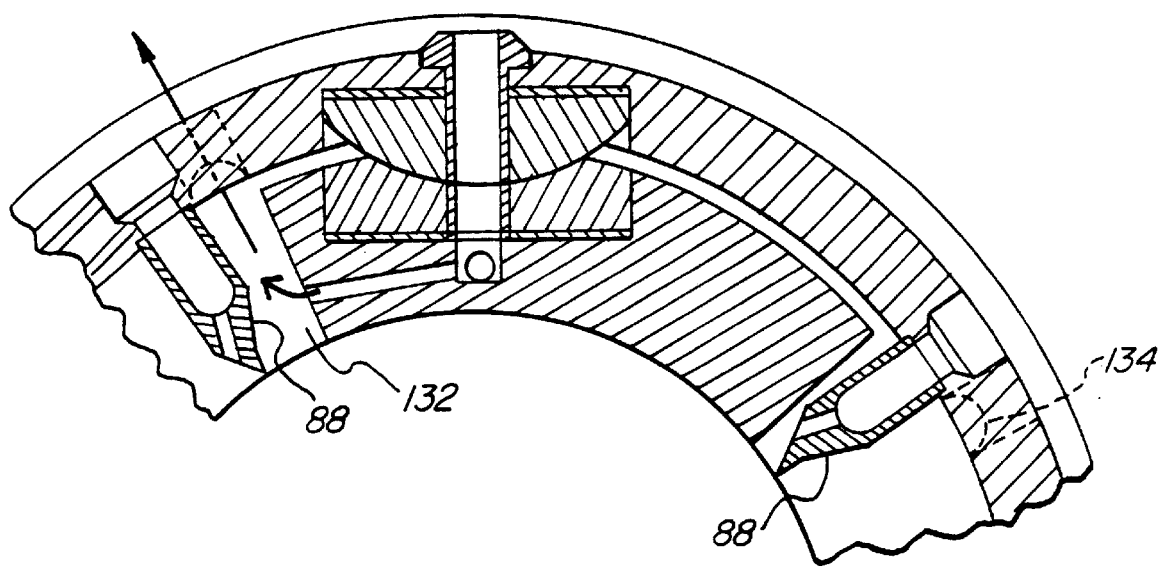
FIG. 10 is a cross-sectional view of the cooling assembly of FIG. 6 taken along lines X—X of FIG. 7.

A drain system illustrated in FIGS. 8 and 10 shows the inlet bypass oil exiting in a space 132 which is formed between the blocker bar 88 and the trailing edge of the pad flat. Similarly to the above discussed, one of the modifications of the drain system includes a drain hole 135 (FIG. 8) opening into the outer surface of the shell. The opening may serve as an oil outlet for both the lubricating and bypass oil. In addition, the drain system includes the recess 136 formed in a lower segment of the side plate of the shell and receiving the lubricating oil from the inner surface of the pads through circumferential channels 138, as explained above.

Referring to FIGS. 11–18, a thrust bearing assembly having a plurality of pads 140, which surround an axis B—B, is shown. Similarly to the above-discussed bearing assemblies, the cool bypass assembly includes heat transfer chambers spaced from a bearing surface to convey cool inlet oil which does not interfere with a lubricating process of the bearing surface.

Figure 11:
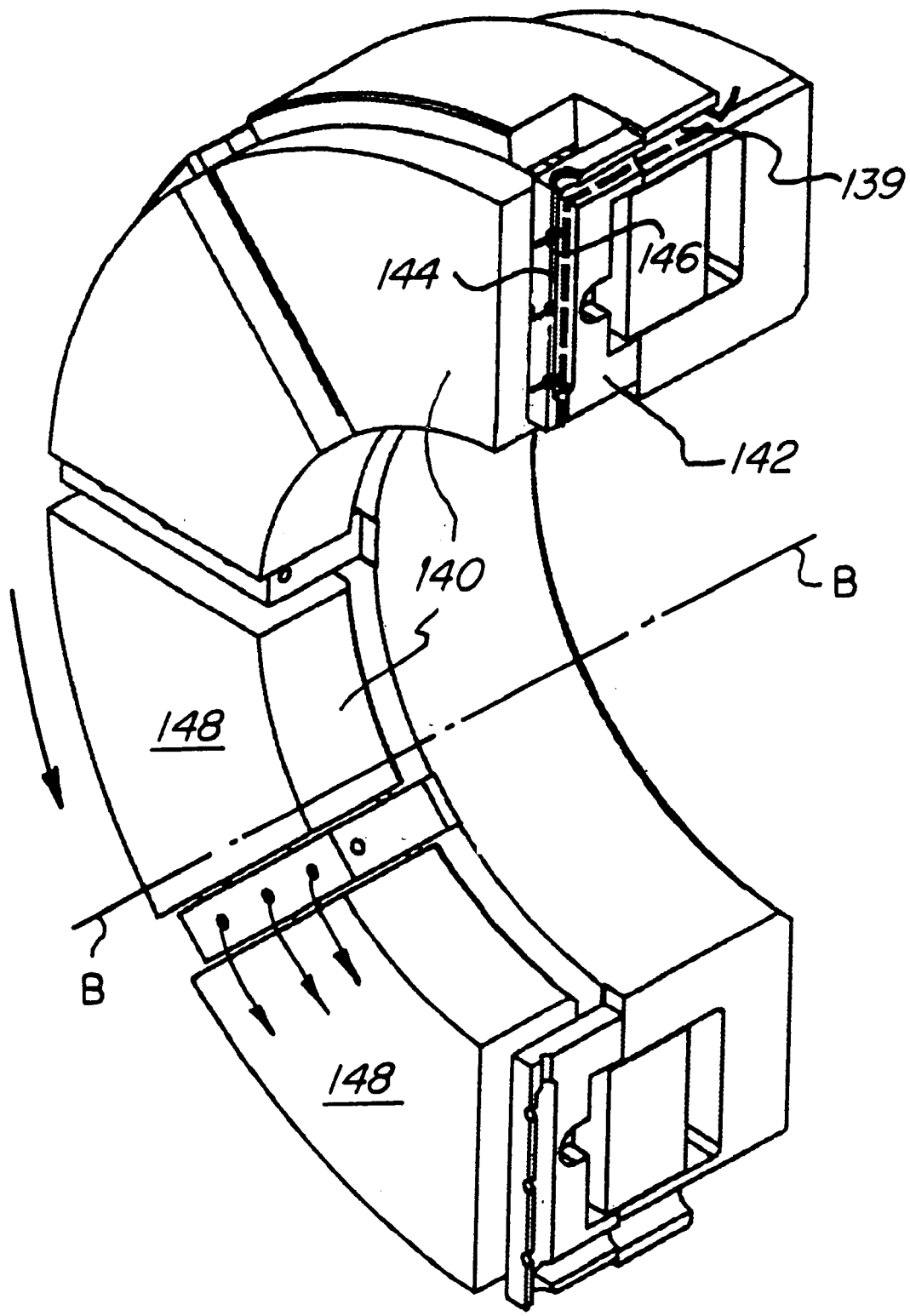
FIG. 11 is a perspective view of the cooling assembly provided in a thrust bearing assembly having an inlet for lubricating oil in accordance with the invention.

FIG. 11 illustrates a spray bar 142 receiving pressurized lubricating oil delivered along an axial channel 139 which is in flow communication with a radial channel 144. The radial channel 144 distributes this oil between a plurality of axial channels 146 through which lubricating is ejected onto a bearing surface 148 juxtaposed with a collar or flange of the shaft.

Figure 12:
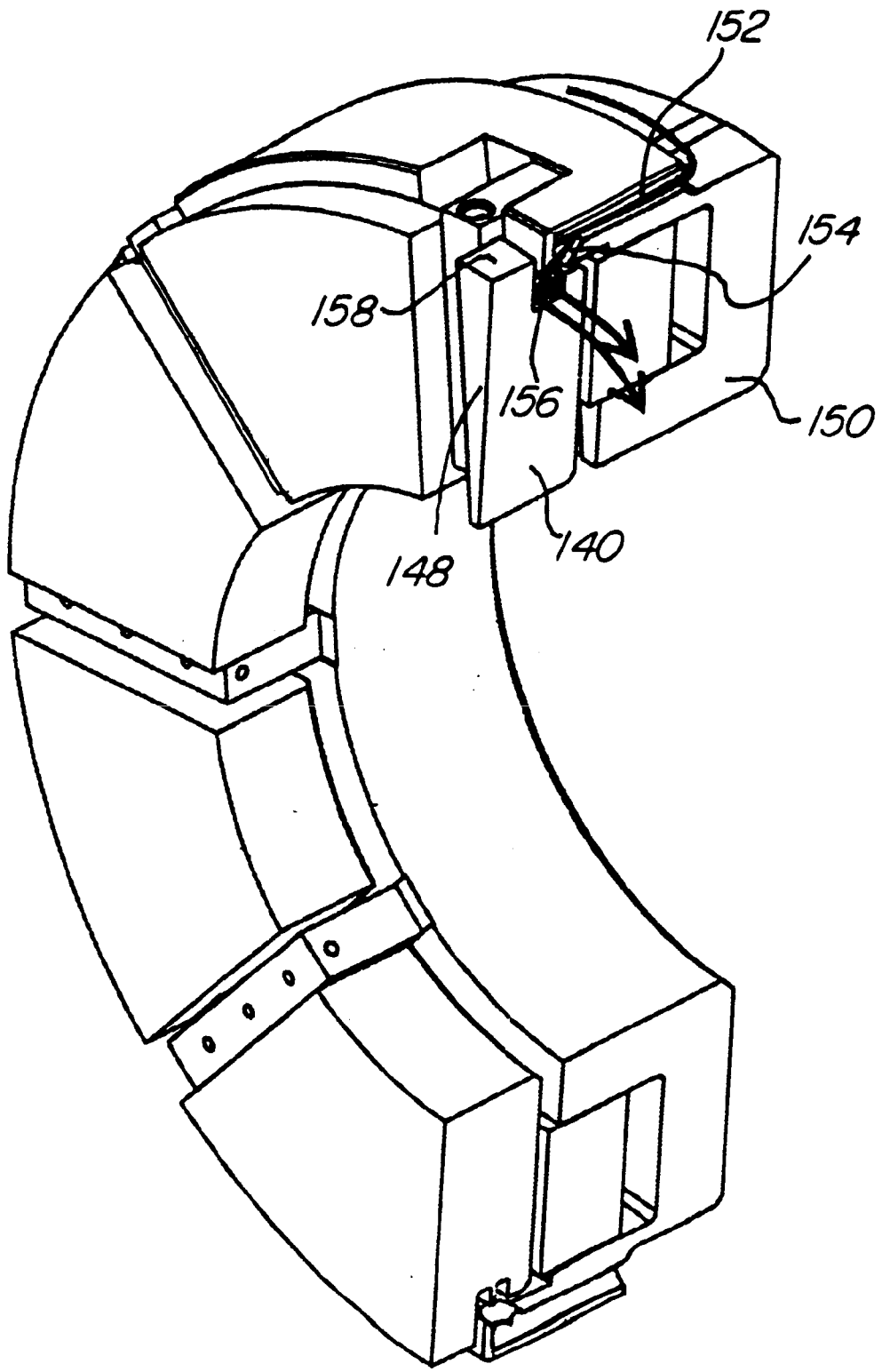
FIG. 12 is an isometric view similar to FIG. 11 and showing an inlet for cool inlet oil.
Figure 13:
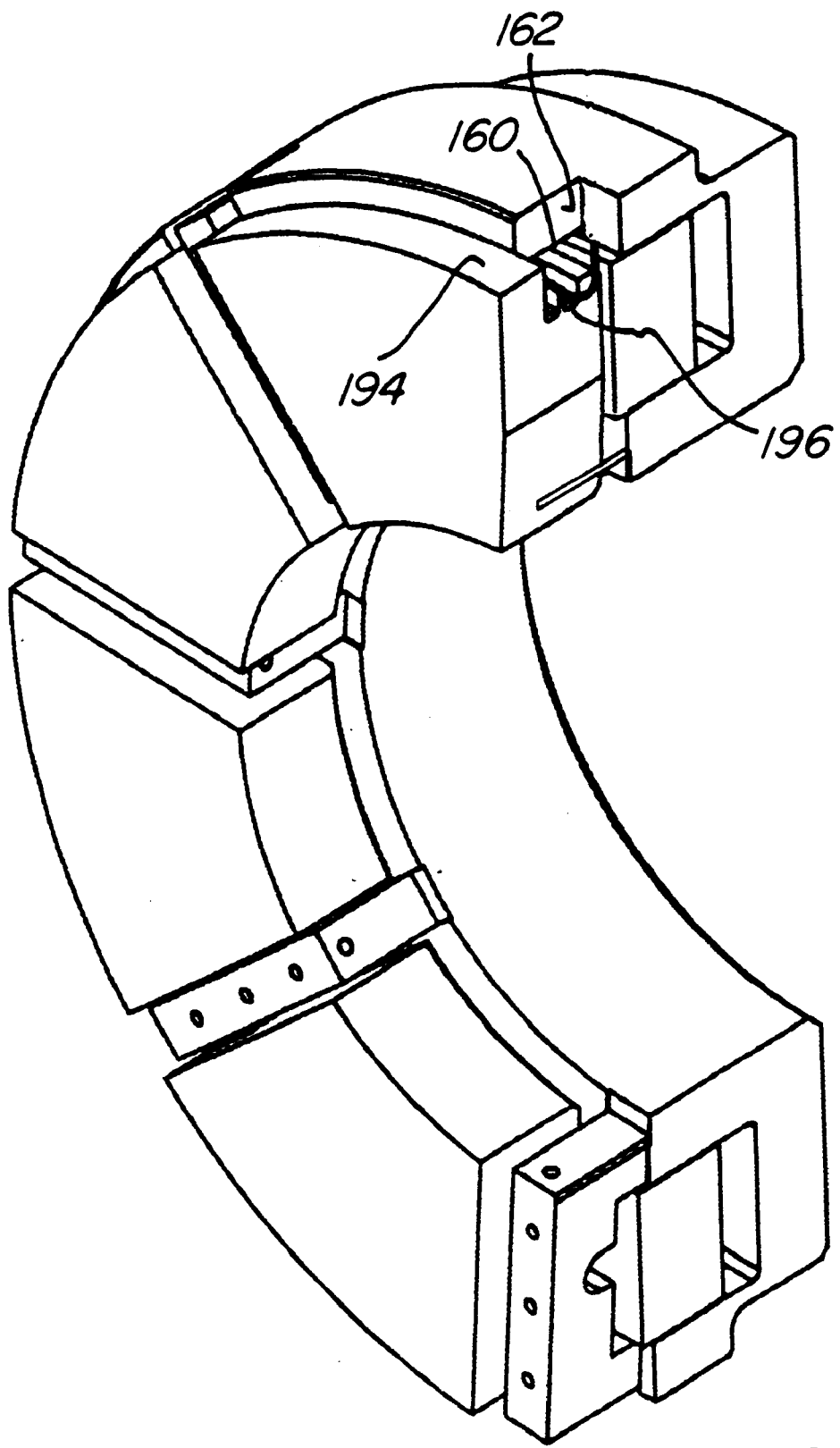
FIG. 13 is an isometric view of the bypass cooling system of FIG. 11 illustrating an outlet for cool inlet oil.

Referring to FIG. 12, a housing 150 has an axial channel 152 for inlet cool oil which is provided in the housing at a circumferential distance from the channel 139 delivering the lubricating oil to the spray bar. The channel 152 has a ramp 154 guiding the pressurized cool oil directly to a recessed region of a top surface 158 of the pad. The recessed region is spaced from the bearing surface 148 and provided with a plurality circumferential heat transfer chambers 156 spaced axially from one another and open upwardly. This arrangement is similar to the one shown in FIGS. 1 and 3. Cool oil traverses the heat transfer chambers and exits through a drain region which opens in a cut out area 162 in the housing, as shown in FIG. 13.

Figure 14:
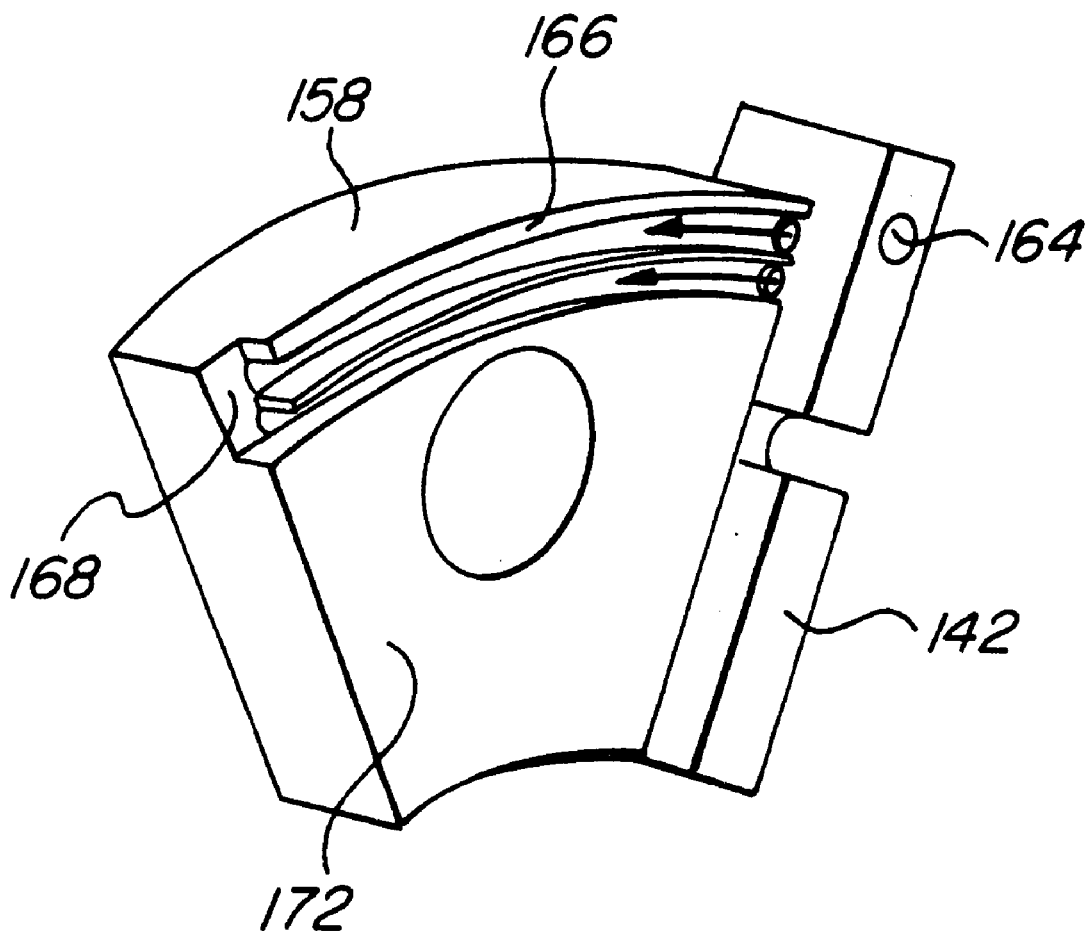
FIG. 14 is an isometric view of another embodiment of an inlet for cool inlet oil of the thrust bearing assembly shown in FIG. 11.
Figure 15:
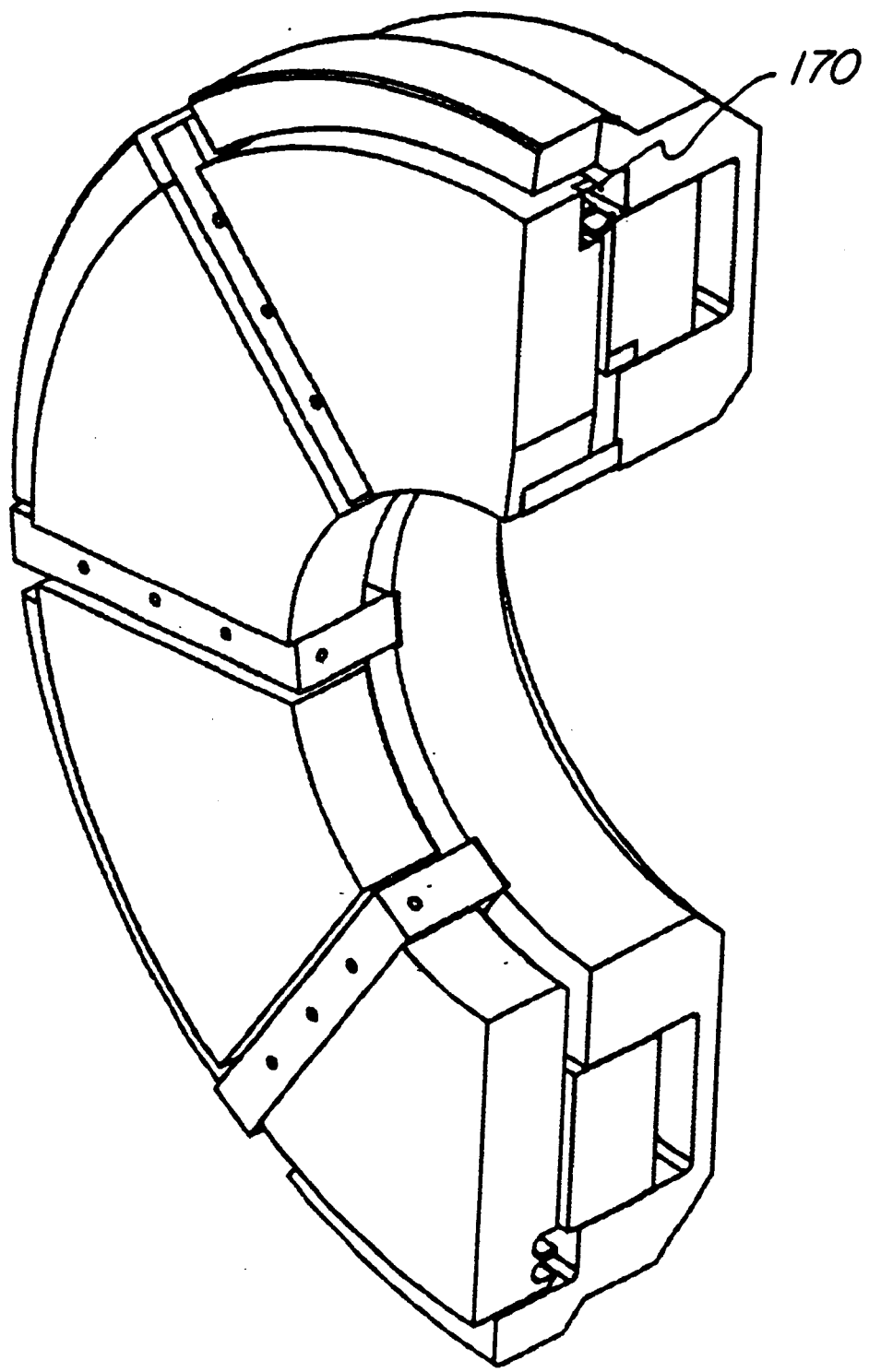
FIG. 15 is an isometric view similar to FIG. 11 and illustrating an outlet for cool inlet oil of FIG. 14.

An inlet assembly for cool oil, as shown in FIGS. 14–15, includes a channel delivering cool oil into an inner channel 164 of the spray bar 142 that distributes the cool oil between circumferential heat transfer chambers 166 provided on an outer side 172 of the pad spaced axially from its bearing surface. The chambers are arranged one under another in a radial direction of the bearing assembly and can be machined as open grooves, as shown in FIG. 14. Alternatively, the chambers can be drilled in the pad's body as channels spaced axially between the bearing and rear sides of the pad. A cut out region 168 radially aligned with an opening 170, which is formed in the hosing, guides the bypass oil out of the pad. Note, a structure analogous to the one disclosed immediately above can be easily implemented in a tilting pad journal.

Figure 16:
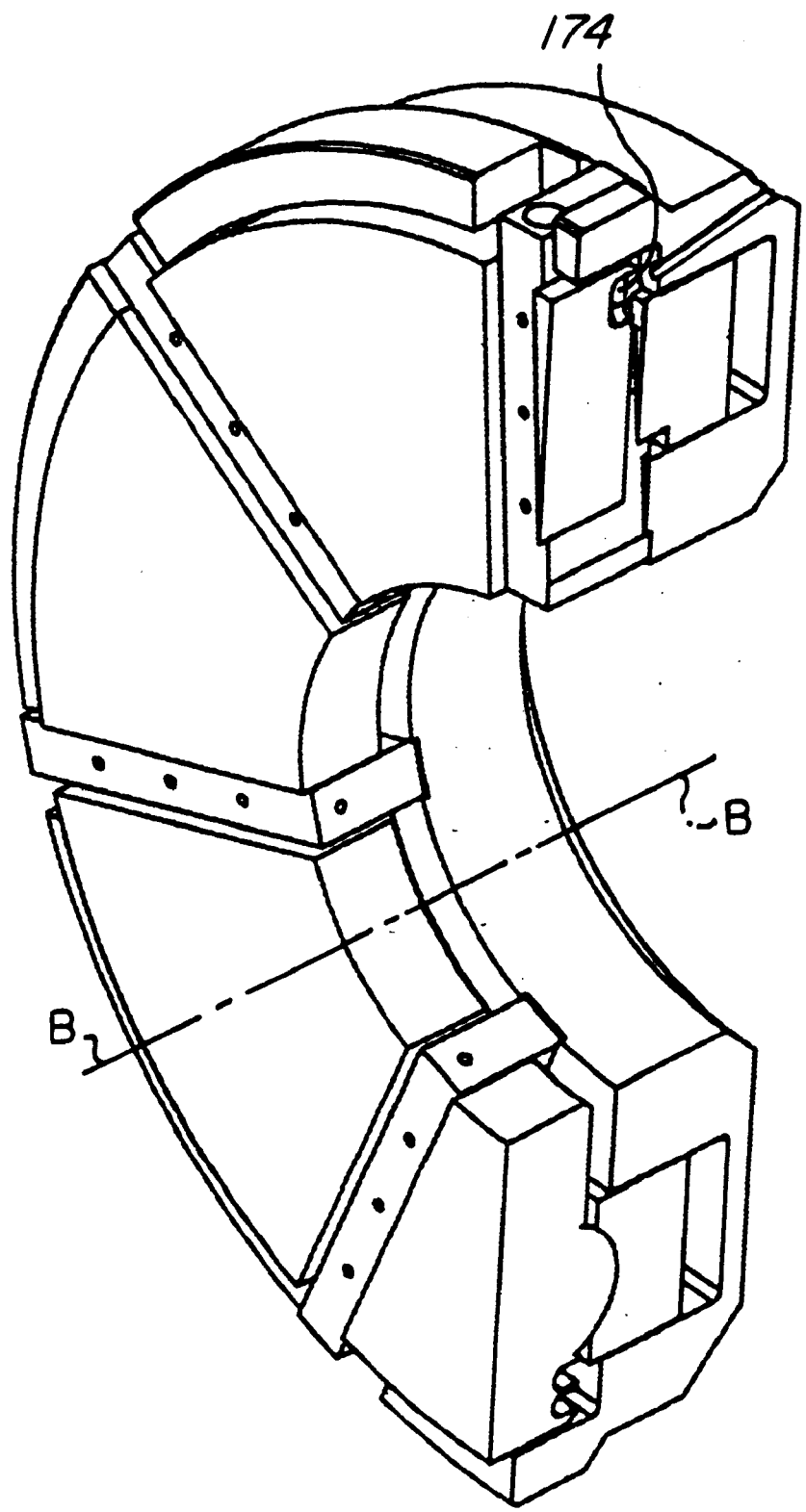
FIG. 16 is an isometric view of the cooling assembly shown in FIG. 11 and showing still another embodiment of an inlet for cool inlet oil.
Figure 17:
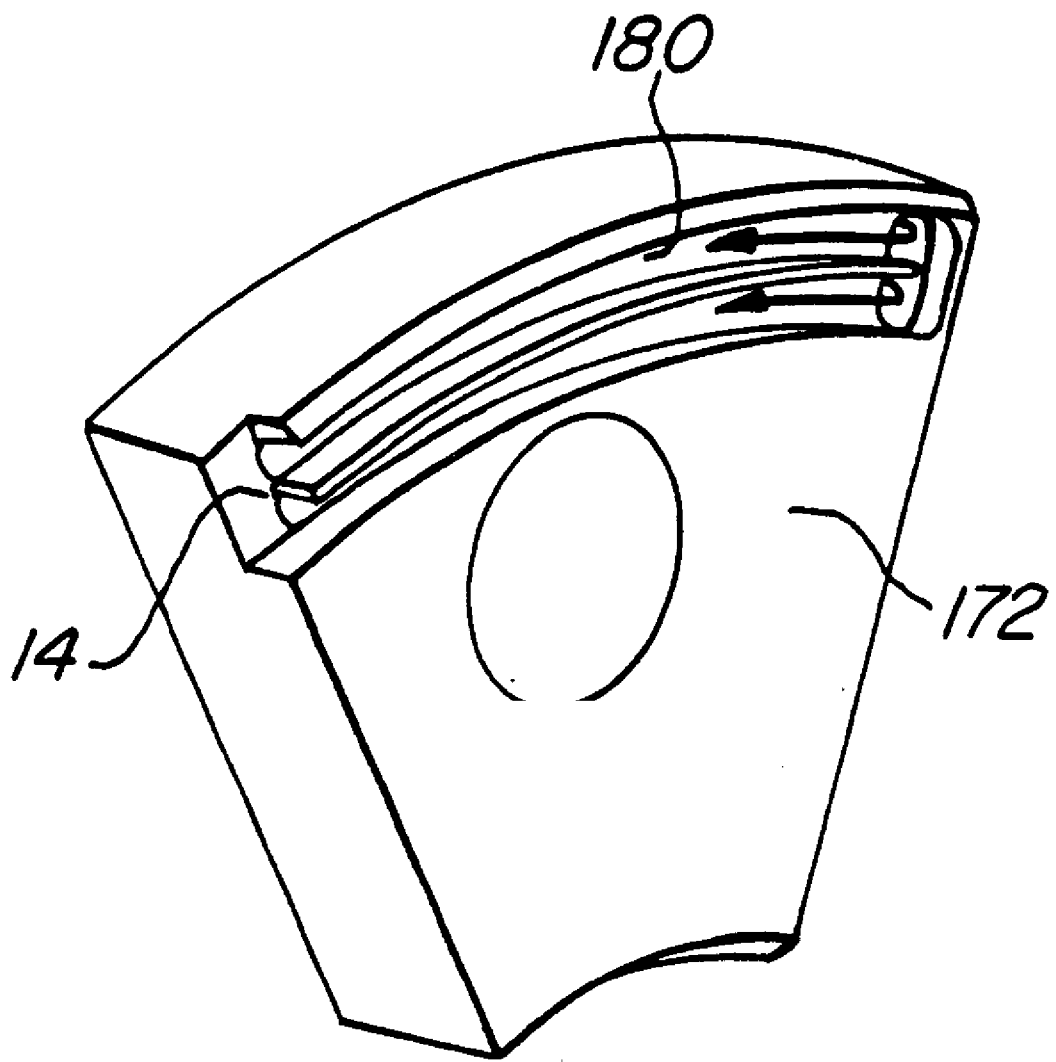
FIG. 17 is a cross section of the embodiment shown in FIG. 16.
Figure 18:
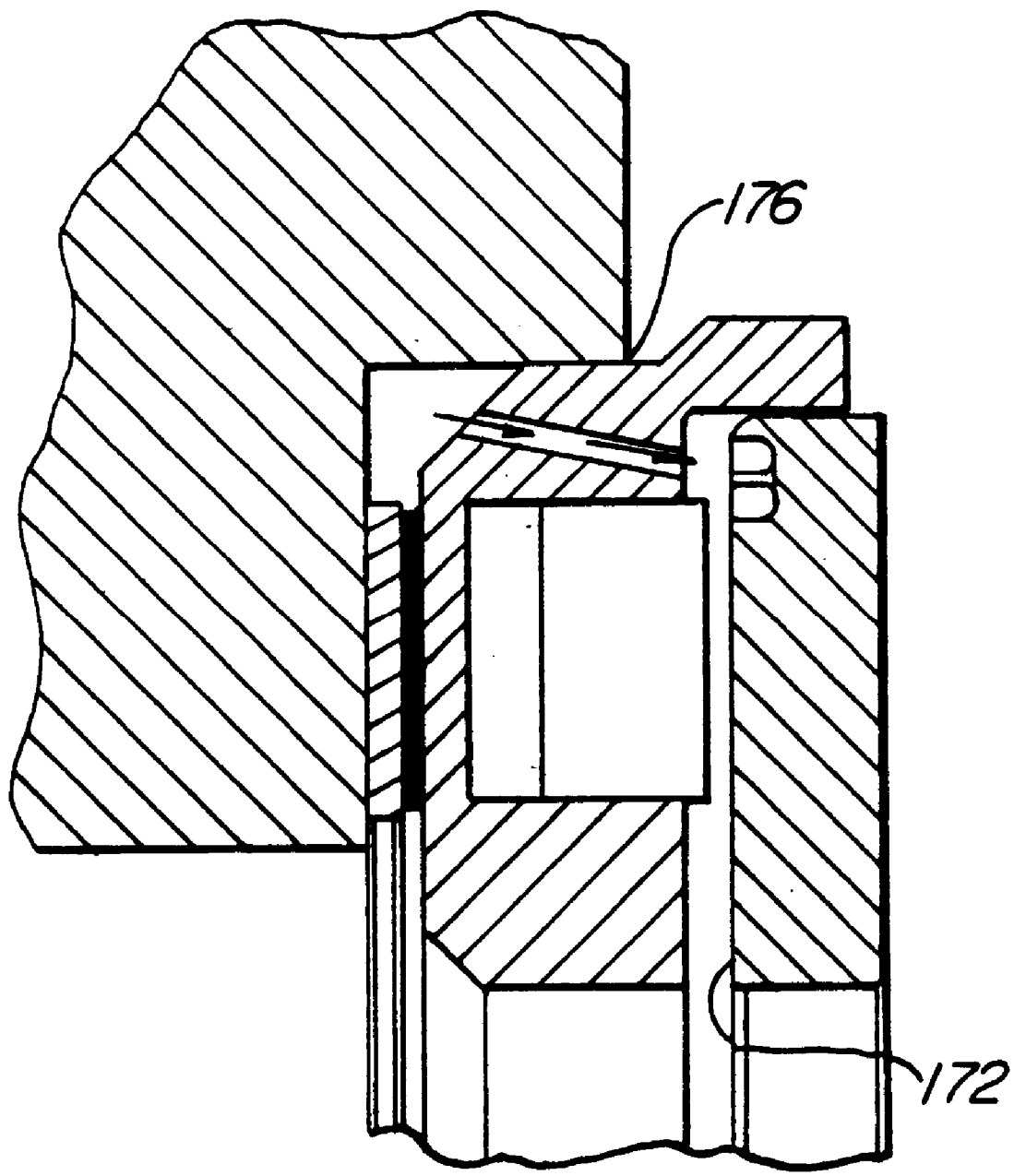
FIG. 18 is an isometric view of heat transfer chambers provided in a rear surface of a pad of the embodiment shown in FIG. 16.

FIGS. 16–18 illustrate still another embodiment of the cool oil inlet geometry allowing the pressurized cool inlet oil to enter directly into a recessed region 174 on the outer side 172 of the pad. Similarly to the embodiment shown in FIGS. 14–15, open heat transfer chambers 180 are spaced apart in a radial direction and circumferentially extend between the inlet 174 and outlet 104, which is radially aligned with an opening formed in the housing. An axial channel 176 extends at an angle with respect to the axis B—B of the rotating member.

Figure 19:
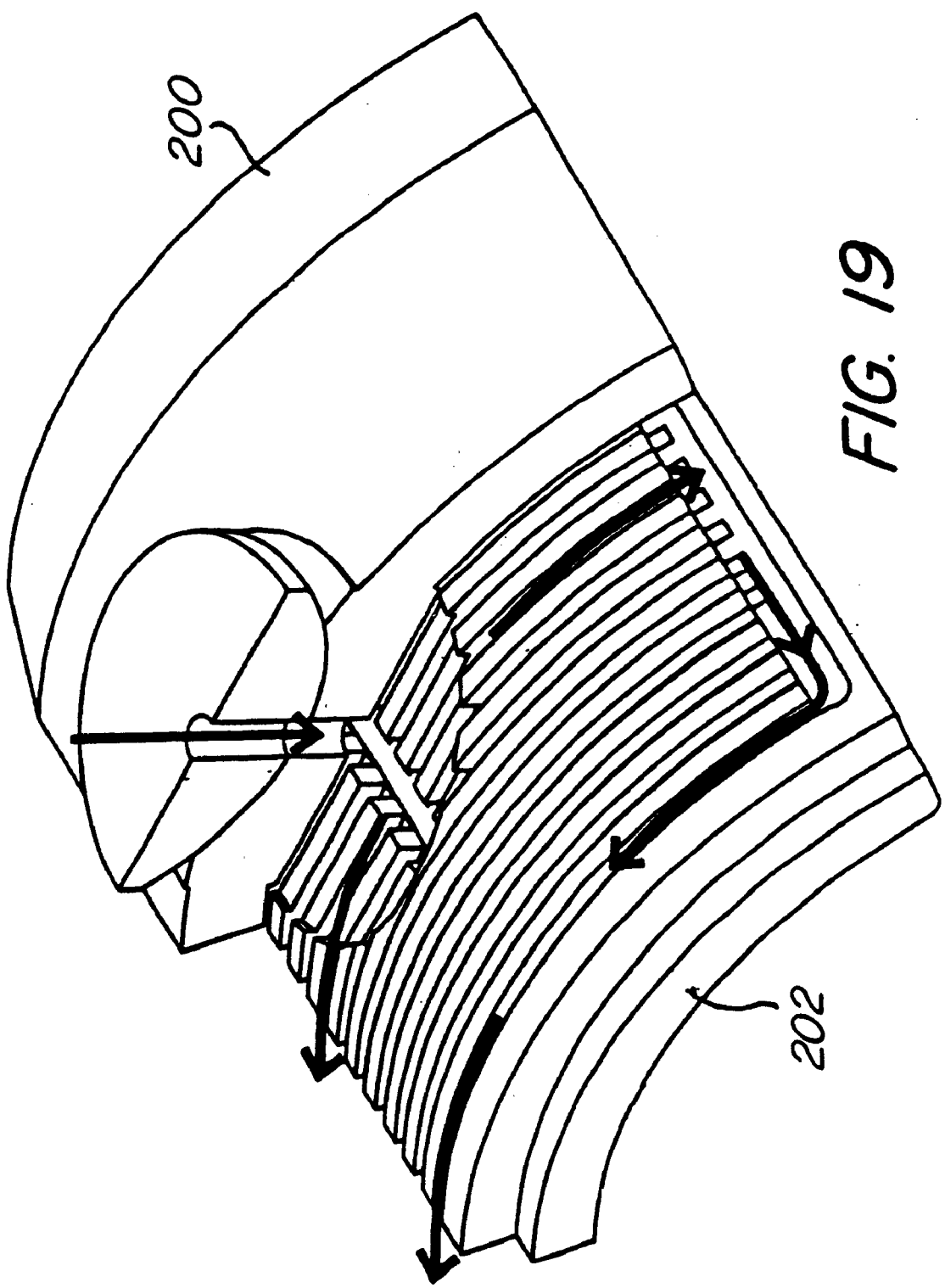
FIGS. 19 and 20 illustrate a tilting pad journal wherein a backing layer is made of carbon or stainless steel, whereas an inner layer is made of copper.
Figure 20:
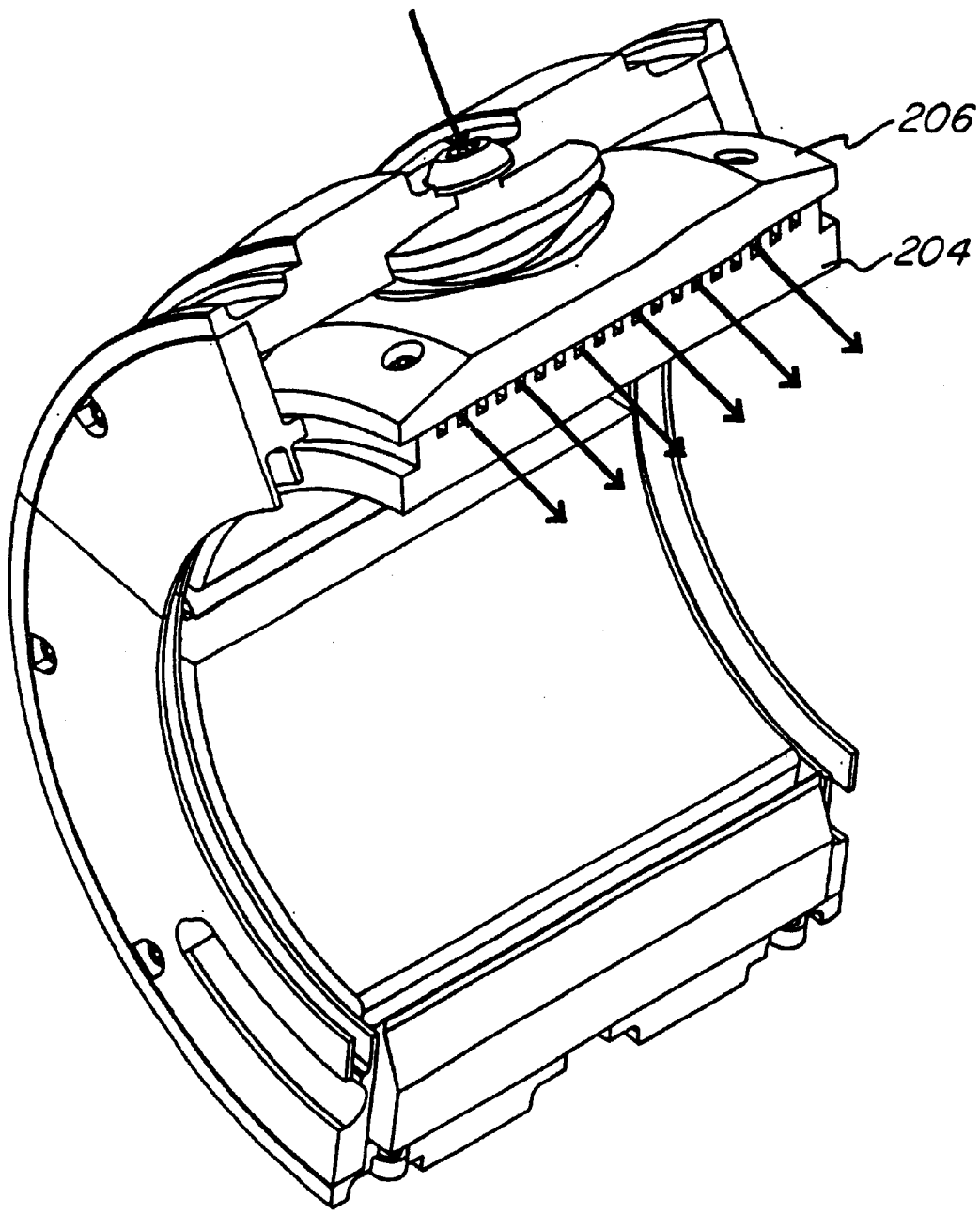

Both tilting pad journal and thrust bearing assemblies have been described as made entirely of Ampcoloy™. However, the scope of the present invention also includes an assembly wherein the pads contain layers of different materials. Thus, for example, referring to FIGS. 4, 19 and 20 each pad 72 can have a backing layer 190, 200 and 206 made of stainless or carbon steel, whereas an inner layer 192, 202 and 204 can be made of copper. Similarly, as shown in FIG. 14, the pad 158 of the thrust bearing shown in FIGS. 14–18, can be formed with a steel backing 172 and a copper inner layer 158, as seen in FIG. 14.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A non-flooding bearing assembly comprising:
   an annular body extending along an axis and open at opposite axial ends to receive a rotating member, the annular body having a bearing surface rotatably supporting the rotating member and an outer surface spaced radially from the bearing surface;
   at least one passage extending between the outer and bearing surfaces and traversed by a pressurized liquid lubricant ejected onto the bearing surface; and
   a plurality of heat transfer chambers provided in the body at a distance from the bearing surface and in flow isolation from the one passage to convey the pressurized liquid lubricant, which picks up the heat conducted away from the bearing surface, so that the pressurized liquid lubricant delivered to the bearing surface does not mix up with the pressurized liquid lubricant flowing along the heat-transfer chambers.

2. The non-flooding bearing assembly defined in claim 1 wherein the outer surface of the annular body has a plurality of annular ribs, each pair of adjacent ribs defining a respective one of the heat transfer chambers; the heat transfer chambers extending from an inlet region, which is recessed through the ribs, to at least one outlet region provided in a lower segment of the annular body.

3. The bearing assembly defined in claim 1 wherein the annular body has axially spaced apart sides, each being provided with a plurality of grooves in flow communication with one outlet region for axially evacuating at least part of the accumulated liquid lubricant traversing the heat transfer chambers from the annular body.

4. A bearing assembly for a rotating member, comprising:
   a generally cylindrical body having a circumferential bearing surface, which rotatably supports the rotating member, and a circumferential outer surface spaced from the bearing surface;
   a passage having a first inlet open into the outer surface and a first outlet opened into the bearing surface to deliver a pressurized liquid lubricant between the bearing surface and rotating member;
   a second inlet receiving the pressurized liquid lubricant and formed on the outer surface and spaced from the first inlet;
   a second outlet provided on the outer surface and spaced circumferentially from the second inlet to discharge the pressurized liquid lubricant; and
   a plurality of circumferential heat transfer chambers between the second inlet and outlet and traversed by the pressurized liquid lubricant, which picks up the heat conducted away from the bearing surface, the circumferential heat transfer chambers being spaced from the bearing surface and in flow isolation from the passage, so that the pressurized liquid lubricant delivered to the bearing surface does not mix up with the pressurized liquid lubricant flowing along the heat-transfer chambers.

5. The bearing assembly defined in claim 4 wherein the heat transfer chambers are open grooves provided on the outer surface of the body.

6. The bearing assembly defined in claim 4 wherein the heat transfer chambers are channels drilled in the body between the outer and bearing surfaces, the bearing surface being babbitted.

7. The bearing assembly defined in claim 4, further comprising a pair of spaced apart side plates flanking the cylindrical body, which is made from a material selected from the group consisting of copper-based alloy, copper-based allow and stainless steel, and copper-based alloy and carbon steel and combinations of these, and having at least one aperture aligned with the second outlet to convey the liquid lubricant traversing the heat transfer chambers from the second outlet.

8. The bearing assembly defined in claim 7 wherein each of the side plates has a circumferential channel open inwardly to receive the liquid lubricant flowing along the bearing surface, and a laterally open drain recess provided in a lower segement of the side plates and flow communication with the circumferential channel to remove the liquid lubricant from the bearing surface.

9. The bearing assembly defined in claim 4, further comprising a housing circumferentially juxtaposed with the outer surface of the body and having a plurality of ribs which define a central channel and a pair of side channels, the housing being of a non-flooded design and provided with spaced apart ports aligned with the first and second inlets and outlets, respectively.

10. The bearing assembly defined in claim 9 wherein the housing has a plurality of spaced apart grooves, each extending between the side channels through the central channel of the housing and being in flow communication with heat transfer chambers.

11. The bearing assembly defined in claim 4 wherein the body is segmented to have a plurality of angularly spaced apart pads, each being tiltably mounted to the housing and provided with the circumferential heat transfer chambers.

12. The bearing assembly defined in claim 11 further comprising a plurality of spray bar blockers extending transversely to the bearing and outer surfaces between the pads to prevent the liquid lubricant, which runs between the bearing surface of each pad and the rotating member, from carrying over from one pad to the next.

13. The bearing assembly defined in claim 12 wherein the passage is provided in the spray bar blocker and includes a first radial channel in flow communication with the first inlet, an axial channel in flow communication with the first radial channel and a plurality of axially spaced second radial channels.

14. A bearing assembly for rotatably supporting a rotating member, comprising:
   a housing extending along an axis and provided with a first and second group of spaced apart delivery conduits traversed by a pressurized liquid lubricant;
   a plurality of pads tiltably mounted to the housing and spaced circumferentially from one another, the pads having bearing surfaces, which rotatably support the rotating member, and outer surfaces spaced from the bearing surfaces;
   at least one passage in flow communication with the first group of delivery conduits for providing a first flow path of the pressurized liquid lubricant toward the bearing surface of the pads; and
   a plurality of circumferentially extending heat transfer chambers provided in the pads at a distance from the bearing surfaces and spaced from the one passage, the heat transfer chambers being in flow communication with the second group of delivery conduits to provide a second flow path for the pressurized liquid lubricant picking up the heat from the bearing surfaces, so that the pressurized liquid lubricant flowing along the first flow path does not interfere with the pressurized liquid lubricant allowing along the second flow path.

15. The bearing assembly defined in claim 14 wherein the heat transfer chambers are drilled in each pad at a distance from the respective outer and bearing surfaces.

16. The bearing assembly defined in claim 14 wherein the heat transfer chambers are outwardly open grooves provided on the outer surface of each pad.

17. The bearing assembly defined in claim 14 wherein the bearing surfaces extend perpendicular to the axis, the bearing assembly further comprising a plurality of spray bar blockers extending between the pads, each of the spray bar blockers having a respective channel in flow communication with the first group of delivery conduits to deliver the pressurized liquid lubricant to the bearing surface.

18. The bearing assembly defined in claim 17 wherein each spray bar blocker has an axial conduit in flow communication with the second group of the delivery conduits and with the heat transfer chambers.

19. The bearing assembly defined in claim 17 further comprising a channel provided in the housing and extending axially toward the outer surface of the pads to directly convey the pressurized liquid lubricant from the second group of delivery conduits to the heat transfer chambers, said axial channel having a ramp extending at an angle toward the axis.

20. The bearing assembly defined in claim 19 wherein the axial channel lies in a plane extending at an angle with respect to the axis.

21. The bearing assembly defined in claim 14 wherein the housing has a non-flooded design, each of the pads being made from copper-based alloy.

22. The bearing assembly defined in claim 14 wherein each of the pads has an outer steel backing layer and an inner layer made of copper-based alloy and adjoining the backing layer.

23. A bypass cooling assembly for a non-flooded bearing selected from the group consisting of tilting pad journal bearings, tilting pad thrust bearings and sleeve bearings, the bearing having a circumferential bearing surface rotatably supporting a rotating member and a circumferential outer surface spaced from the bearing surface, the bypass cooling assembly comprising:
   an inlet provided in the outer surface and receiving a pressurized cool liquid medium;
   an outlet provided open into the outer surface and spaced circumferentially from the inlet to discharge the cool liquid medium; and
   a plurality of circumferential heat transfer chambers between the inlet and outlet and in flow communication therewith, the circumferential heat transfer chambers being provided in the bearing at a distance from the bearing surface to and traversed by the cool liquid medium which picks up the heat conducted away from the bearing surface.

24. A method for carrying the heat away from a non-flooded housing of a bearing which is selected from the group consisting of tilting pad journal, thrust and sleeve bearings, the bearing having a babbitted bearing surface rotatably supporting a rotatable member and an outer surface, comprising the steps of:
   providing a plurality of spaced apart circumferential passages extending in a plane between the bearing and outer surfaces;
   delivering a pressurized liquid lubricant to the circumferential passages;
   providing at least one passage in the bearing extending between the bearing and outer surfaces, the one passage and circumferential passage being in flow isolation;
   delivering the pressurized liquid lubricant along the one passage to lubricate the bearing surface, thereby preventing-the pressurized liquid lubricant flowing along the circumferential passage and the one passage from mixing up; and
   evacuating the pressurized liquid lubricant from the bearing.

* * * * *

UNITED STATES PATENT AND TRADEMARK OFFICE
CERTIFICATE OF CORRECTION

PATENT NO.     : 6,485,182 B2
DATED          : November 26, 2002
INVENTOR(S)    : John C. Nicholas It is certified that error appears in the above-identified patent and that said Letters Patent is hereby corrected as shown below:

<u>Title page, Item [54] and Column 1, lines 1-2,</u>
Should read -- BEARING ASSEMBLY WITH BYPASS COOLING --

Signed and Sealed this

Twenty-seventh Day of May, 2003

JAMES E. ROGAN
*Director of the United States Patent and Trademark Office*